United States Patent [19]

Halford

[11] Patent Number: 4,762,075

[45] Date of Patent: Aug. 9, 1988

[54] SEED/FERTILIZER MINIMUM TILLAGE PLANTER

[76] Inventor: James W. Halford, Box 417, Indian Head, Saskatchewan, Canada, S0G 2K0

[21] Appl. No.: 49,571

[22] Filed: May 14, 1987

Related U.S. Application Data

[63] Continuation of Ser. No. 745,952, Jun. 18, 1985, abandoned.

[30] Foreign Application Priority Data

Jun. 19, 1984 [GB] United Kingdom ............... 8415562

[51] Int. Cl.⁴ ............................................. A01C 5/08
[52] U.S. Cl. ........................................ 111/73; 111/85
[58] Field of Search ................. 11/1, 7, 14, 34, 52, 11/58, 59, 73, 80, 83–86; 172/81, 517, 538, 747; 301/63 PW; 193/2, 25.5

[56] References Cited

U.S. PATENT DOCUMENTS

| | | | |
|---|---|---|---|
| 308,305 | 11/1884 | Corbin | 111/86 X |
| 332,919 | 12/1885 | Marks | 111/86 |
| 1,109,756 | 9/1914 | Hurlbut | 111/73 |
| 1,171,882 | 2/1916 | Ray | 111/69 |
| 1,857,749 | 5/1932 | White . | |
| 2,005,440 | 6/1935 | Sciarini | 172/517 X |
| 2,176,528 | 10/1939 | Gilchrist | 111/52 |
| 2,357,760 | 9/1944 | Peacock | 111/73 |
| 2,554,061 | 5/1951 | Sandberg | 111/85 |
| 2,764,111 | 9/1956 | Collins | 111/70 |
| 2,889,788 | 6/1959 | Van Dorn | 111/80 |
| 2,920,587 | 1/1960 | Shriver . | |

(List continued on next page.)

FOREIGN PATENT DOCUMENTS

| | | | |
|---|---|---|---|
| 244384 | 10/1960 | Australia | 111/73 |
| 284261 | 9/1966 | Australia | 111/86 |
| 180431 | 5/1954 | Austria | 111/85 |
| 638550 | 3/1962 | Canada | 111/73 |
| 861840 | 1/1971 | Canada | 111/87 |
| 1060720 | 8/1979 | Canada | 111/73 |
| 1089719 | 11/1980 | Canada | 111/73 |
| 1171907 | 9/1984 | Canada | 111/73 |
| 2117135 | 10/1971 | Fed. Rep. of Germany | 111/80 |
| 3122713 | 10/1982 | Fed. Rep. of Germany . | |
| 981129 | 5/1951 | France | 111/86 |
| 381664 | 7/1940 | Italy | 111/73 |
| 5033 | of 1895 | United Kingdom . | |
| 261793 | 11/1968 | U.S.S.R. | 111/85 |
| 323090 | 8/1970 | U.S.S.R. | 111/85 |

OTHER PUBLICATIONS

La Croix, L. H., *Seed Germination of Fields–What's the Best Environment* (apparent report), Dept. of Plant Science, Univ. of Manitoba, pp. 72–78 (date unknown).

Sadler, J. M. et al, "Effect of Placements and Rates of Band-Applied Phosphorus on Growth and Uptake of Soil and Fertilizer Phosphorus by Flax", Can. J. Soil Sci., 61:303–310 (May 1981).

Heinonen, R. et al, "Fertilizer Placement for Small Grains" (apparent report, apparently incomplete), Dept. of Soil Sciences, Swed. Univ. of Agr. Sci., S-75-0-07 Uppsala, Sweden.

Halford, J. et al, "Conserva Pak Seeder" (sales leaflet ad), Vale Farms Ltd., P.O. Box 417, Indian Head, Sask. S0G 2K0 Canada, Jun. 1984.

*Primary Examiner*—James R. Feyrer
*Attorney, Agent, or Firm*—Adrian D. Battison; Stanley G. Ade

[57] ABSTRACT

Apparatus for seed and fertilizer placement in the ground comprises a knife followed immediately by a first tube for depositing fertilizer and a second tube spaced therefrom for depositing the seed. The second tube can be adjusted horizontally and vertically and particularly to a position scraping the side of the furrow formed by the knife to deposit the seed at the side. A packer wheel mounted on the same support as the second tube follows the second tube and runs in the furrow to press down soil over the seed and fertilizer. The packer wheel is rotationally molded from polyethylene.

10 Claims, 4 Drawing Sheets

U.S. PATENT DOCUMENTS

| | | | |
|---|---|---|---|
| 2,968,266 | 1/1961 | Gustafson | 111/73 X |
| 2,981,213 | 4/1961 | O'Neil | 111/52 |
| 3,042,118 | 7/1962 | Norris | 111/85 |
| 3,092,052 | 6/1963 | Andersen | 111/7 |
| 3,177,830 | 4/1965 | Zimmerman | 111/85 |
| 3,292,562 | 12/1966 | Clark | 111/7 |
| 3,319,589 | 5/1967 | Moran | 111/7 |
| 3,335,681 | 8/1967 | Main et al. | 111/64 |
| 3,453,977 | 7/1969 | Sorenson | 111/36 |
| 3,470,933 | 10/1969 | Molnar | 152/330 |
| 3,664,279 | 5/1972 | Belden | 111/80 |
| 3,708,019 | 1/1973 | Ryan | 172/470 |
| 3,797,418 | 3/1974 | Bridger | 111/73 |
| 3,799,079 | 3/1974 | Dietrich | 111/7 |
| 3,877,401 | 4/1975 | Gutman | 111/7 |
| 3,946,681 | 3/1976 | Sylvester | 111/7 |
| 4,004,640 | 1/1976 | Bland | 172/705 |
| 4,116,139 | 9/1978 | Sauer | 111/7 |
| 4,116,140 | 9/1978 | Anderson et al. | 111/52 |
| 4,231,306 | 11/1980 | Whitehead et al. | 111/7 |
| 4,311,104 | 1/1982 | Steilen et al. | 111/85 |
| 4,424,757 | 1/1984 | Gibbens | 111/7 |
| 4,580,507 | 4/1986 | Dreyer | 111/73 |
| 4,691,645 | 9/1987 | Anderson | 111/73 X |

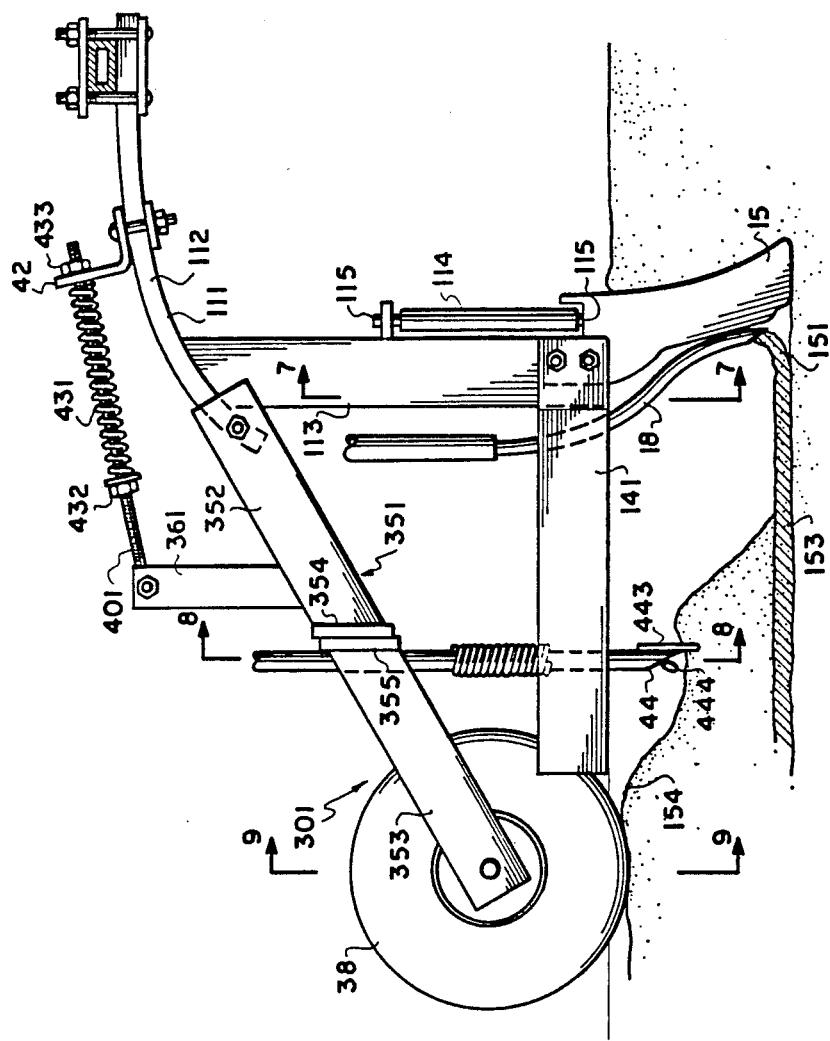

SEED/FERTILIZER MINIMUM TILLAGE PLANTER

This application is a continuation application of application Ser. No. 745,952 filed June 18, 1985 and now abandoned.

BACKGROUND OF THE INVENTION

This invention relates to an apparatus for placing in the ground two separate materials such as seed/fertilizer particularly but not exclusively for use in minimum tillage or direct drilling applications.

There is an increasing awareness of the need to conserve the dry land soil resource existing in the great plains area of the United States and Canada.

This includes the recognition that farm implements are required which permit the placing of fertilizer and various seeds in the soil, at their recommended depths and in an optimum relationship one to the other.

In the so called zero tillage system, there is also the need to be able to directly plant into the trash and residue from previous crops without any prior tillage taking place.

Many existing machines have been designed specifically to enable seed and fertilizer to be deposited in the soil under this system. Furthermore many of the machines have relied on a relatively heavy massive design to ensure the desired penetration into the unworked ground and this has meant relatively expensive and job specific machines having high energy demand during field first material, a packer wheel and operation.

During the past few years, the potential of utilizing cultivators, both heavy and light, as a seeding machine together with an air or gravity delivery system, has been attempted with a plurality of designs. The main problems which have been evident in these designs, are a lack of depth control and considerable difficulty in obtaining sufficient packing of soil around the seed. For this reason, multi-function machines have been designed which include a cultivator section, a seeding section, perhaps a harrowing section and finally a packing section. With the relatively wide machines now in popular use, this has meant an unwieldy arrangement of parts which are difficult to control and to set one relative to the other.

The rapid adoption of present technology relative to soil conservation techniques will require the availability of machines which initially may serve a dual purpose in order to enable a gradual transition to take place, from conventional relatively extensive tillage methods of farming to reduced or minimum tillage systems which of course will permit the operator the opportunity to test the new system with a small increase in their total capital cost.

It is a first object of the invention, therefore, to provide a planting apparatus for placing two separate materials such as seed and fertilizer in a single action which is simple, inexpensive and effective.

According to a first aspect of the invention, therefore, there is provided an apparatus for planting two different materials in the ground comprising a frame adapted for transport across the ground, means for cutting a furrow in the ground, means mounting the cutting means on the frame and arrange to cut a furrow in the ground as the frame is moved forwardly over the ground, a first tube, means for supplying a first material to the first tube, means mounting the first tube immediately rearwardly of the cutting means for depositing said fertilizer into the furrow, a second tube, means for supplying a second material to the second tube, means mounting the second tube rearwardly of the first and being free from means to form a second furrow separate from the furrow so that the second tube follows in the furrow formed by the cutting means and arranged such that the second tube is spaced from the first by a distance sufficient to allow soil to fall into the furrow therebetween as the tubes are moved along the furrow behind the cutting means and adapted to be able to deposit the second material at a different location in the furrow from the means mounting the packer wheel rearwardly of the second tube for following in the furrow behind the second tube.

The present seed/fertilizer placement system provides a soil working tool which causes a minimum disturbance of the soil in the seed row area and which will leave undisturbed, strips of soil between the seed rows. It will also allow optimum depth control and separation of seed and fertilizer depending upon the requirements.

According to a second aspect of the invention there is provided an apparatus for use in a planting operation comprising a frame adapted for transport across the ground, means for cutting a furrow in the ground, means mounting the cutting means on the frame and arrange to cut a furrow in the ground as the frame is moved forwardly over the ground, a packer wheel, means mounting the packer wheel for following in the furrow behind said cutting means and bearing means for rotationally supporting said packer wheel on said mounting means, said packer wheel being formed wholly from a plastics material.

With the foregoing in view, the other advantages as will become apparent to those skilled in the art to which this invention relates as this specification proceeds, the invention is herein described by reference to the accompanying drawings form a part hereof, which includes a description of the best mode known to the applicant and of the preferred typical embodiment of the principles of the present invention, in which:

DESCRIPTION OF THE DRAWINGS

FIG. 5 is a side elevational view of a modified machine according to the invention.

In the drawings like characters of reference indicate corresponding parts in the different figures.

DETAILED DESCRIPTION

Figure 1:
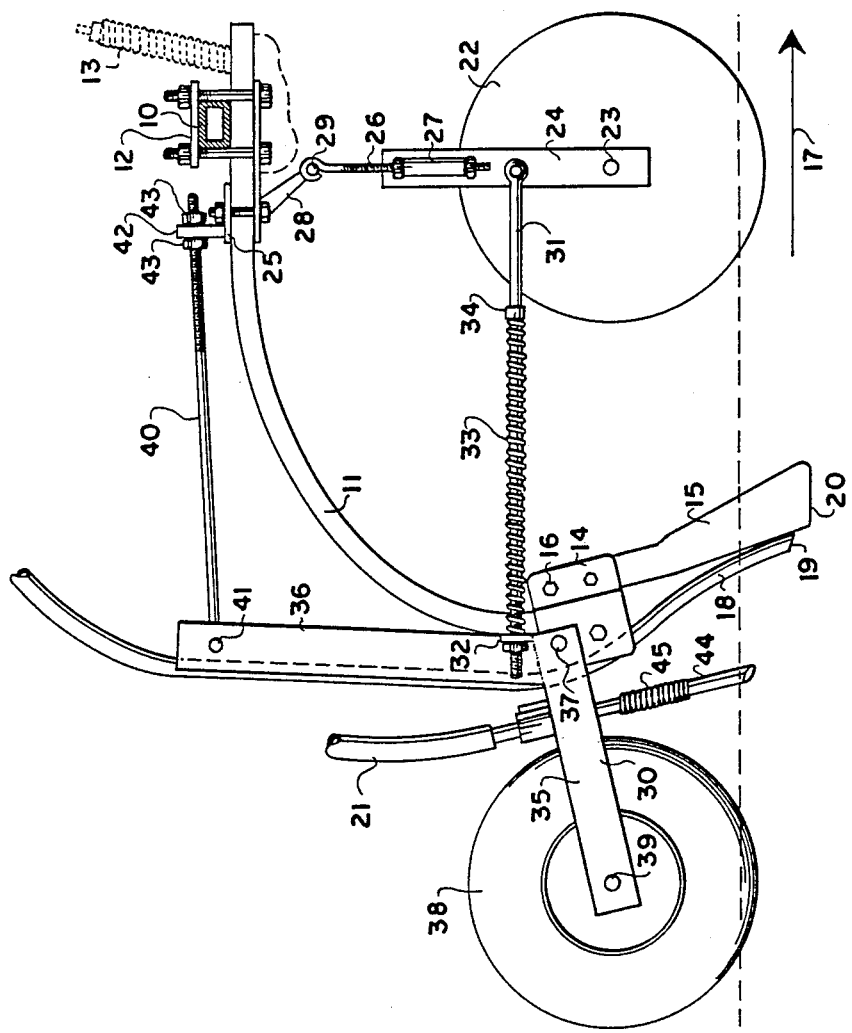
FIG. 1 shows a schematic side elevation of such a machine.

Reference should first be made to FIG. 1 in which 10 illustrates a cross-member of a machine which may take the form of a conventional cultivator or a wheel mounted chassis in order to carry the system being described.

A shank 11 is mounted upon the underside of the cross-members 10 by means of a conventional U-bolt assembly 12 and, if desired, a trip mechanism 13 may be incorporated for the shank 11. This shank 11 curves downwardly and rearwardly from the U-bolt assembly and terminates in a bracket 14 which is situated just above the ground surface when the tool is in the working position and the entire placement assembly is mounted to the shank 11 via this bracket 14 and other connections which will hereinafter be described.

It will of course be appreciated that only one seed/fertilizer placement device is illustrated but that a plurality of these devices may be secured to cross-tube 10 in spaced apart relationship in a manner similar to cultivator shank assemblies.

The bracket 14 carries one furrow opening knives 15 secured to the bracket by means of bolts 16 with the knife extending downwardly and facing forwardly at a slightly inclined angle, it being understood that the machine proceeds in the direction of arrow 17.

A seed or fertilizer tube 18 is situated immediately behind the knife 15 with the exit 19 being just above the lower edge 20 of the knife, and this tube may be connected via a tube to a source of seed or fertilizer depending upon the requirements of the operation. The tube 18 may be supported by bracket 14 if desired.

A disk coulter blade 22 is journalled for rotation upon pin 23 between a pair of vertical brackets 24 which in turn are supported from a bracket assembly 25 secured to the shank 11 just rearwardly of the crossmember 10. Screw threaded adjustment rods 26 are situated one upon each side of the pair of brackets 24 and engage through threaded sleeves 27 and the other end of these rods is pivoted to members 28 extending from brackets 25, by means of pivot pins 29. Adjustment of these rods 26 moves the coulter upwardly or downwardly as desired.

The brackets 24 are also connected to a bell crank member 30 by means of rods 31 pivoted on the brackets and engaging freely through brackets 32 and being protected by compression springs 33 surrounding the rods and reacting between brackets 32 and stops 34 on rods 31 as clearly shown. This means that if the coulter 22 strikes an obstruction, it may swing rearwardly around pivots 29 with the rods 31 sliding through brackets 32 and will be returned to the original position by means of springs 33 when the obstruction has been passed.

The bell crank 30 includes a lower crank portion 35 defined by a pair of parallel plates and a substantially vertical crank portion 36, pivoted to bracket 14 upon a pivot pin 37. A packer/depth control wheel 38 is journalled for rotation adjacent to the rear end of the bell crank portion 35, upon pin or shaft 39. It is desirable that this packer/depth control wheel 38 be manufactured from an elastomeric substance to reduce the adhesion of mud, trash, etc. thereto and to provide a simple elastomeric bearing upon pin or shaft 39.

The positioning of the wheel 38 is by means of a screw threaded rod 40 pivoted by the rear end thereof to pivot pin 41 extending through adjacent the upper end of the vertical portion 36 of the bell crank 30. This rod extends through an upstanding portion 42 of the bracket 35 secured to the shank 11 with nuts 43 on each side thereof engaging the screw threaded portion of rod 40 and providing adjustment for the position of the wheel 38.

Figure 2:
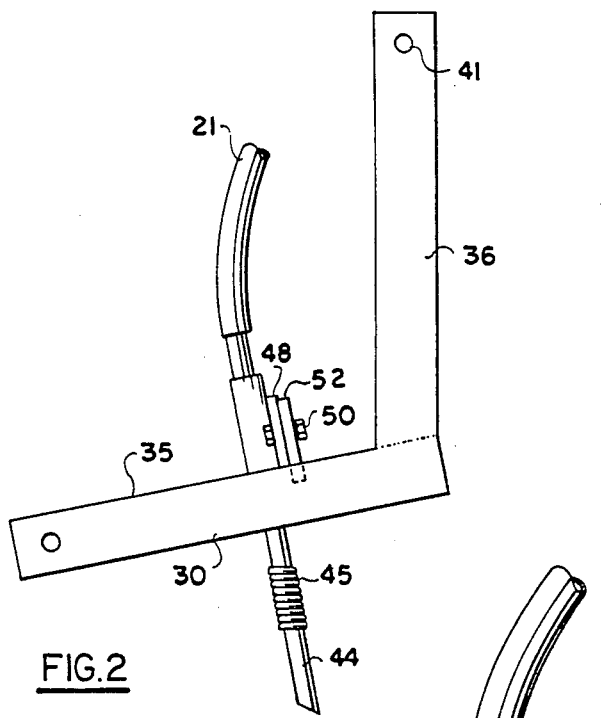
FIG. 2 shows an enlarged fragmentary view of the adjustable seed tube assembly per se.
Figure 3:
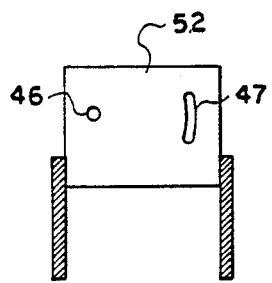
FIG. 3 shows a fragmentary rear view of the bracket holding the adjustable tube of FIG. 2.
Figure 4:
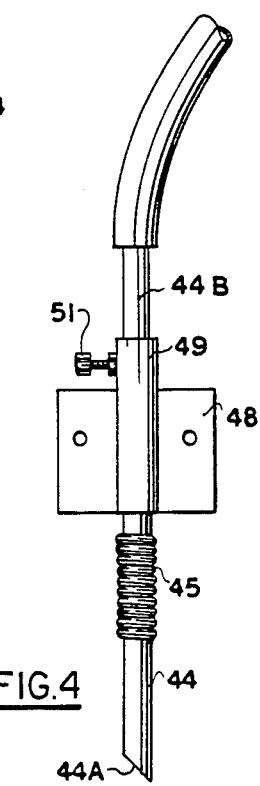
FIG. 4 shows a rear view of the adjustable tube of FIG. 2 adapted to be engaged upon the bracket of FIG. 3.
Figure 7:
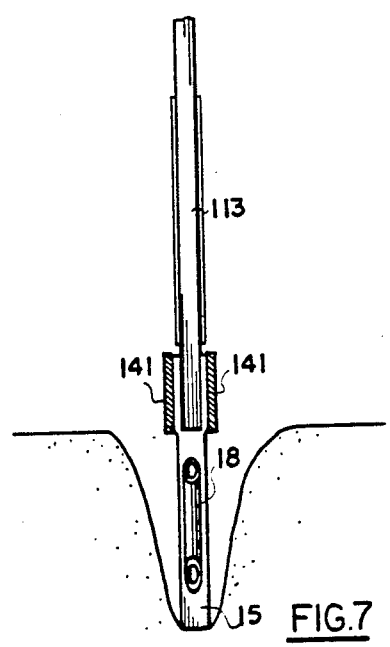
FIGS. 7, 8 and 9 are cross sectional views along the lines 7—7, 8—8 and 9—9 respectively of FIG. 5.
Figure 6:
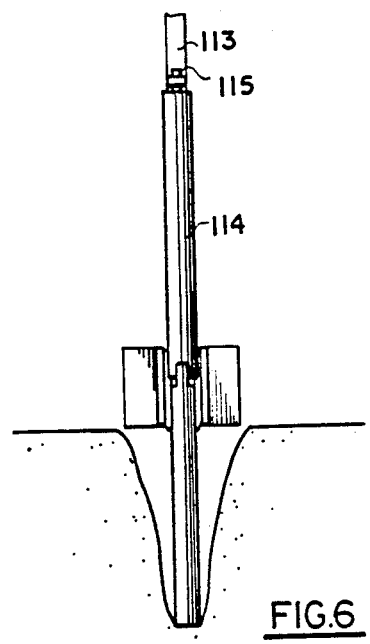
FIG. 6 is a partial front elevational view of the apparatus of FIG. 5.

A further tube 44 having a spring section 45 therein for protection purposes, is mounted between the pair of plates 35 forming the lower bell crank portion, one upon each side of the packer wheel 38 and this may also be connected to a feed tube 21 which in turn extends to a source of seed and/or fertilizer as desired. FIGS. 2, 3 and 4 show details of the mounting and adjustment potential of this particular tube 44.

A rectangular bracket 52 is secured between the two portions 35 of the bell crank forwardly of the packer wheel 38 and this bracket includes an aperture 46 on one side and a slotted hole 47 on the other side. Details of this are shown in FIG. 3.

The upper portion of the mounting for the tube 44 includes a further rectangular bracket 48 having a tube mounting sleeve 49 thereon through which tube portion 44B extends above the spring portion 45 thereof and this bracket 48 is secured to bracket 52 by means of bolts 50. At least one set screw 51 engages through the mounting tube 49 and permits tube 44 to be adjusted vertically relative to the brackets 52 and 48 and hence relative the member 35 of the bell crank assembly, it being understood that set screw 51 is then tightened to hold tube 44 in the desired position. Tube 44 is formed in two sections, an upper section and a lower section, with the adjacent inner ends being secured within the ends of the spring which acts as a tube connecting portion.

The outlet 44A of the tube 44 may be adjusted from side to side relative to the base 20 of the knife 15 by loosening bolts 50 and swinging bracket 48 and hence tube 44 around the pivot formed by a bolt engaging aperture 46, it being understood that the other bolt moves in the vertical slot 47 and thus enables the placement of the seed/fertilizer from side to side and vertically relative to the material being deposited through the fixed tube 19.

In operation, the total seeding machine is lowered to working position and held by the normal wheels (not illustrated) supporting the structure of which crossmember 10 forms a part and these wheels will provide some control over the depth of tillage. The operator then adjusts the packer/depth control wheel 38 of each individual unit by means of the adjustment rods 40 to obtain the desired depth of operation of the primary tillage tool in the form of knife 15 and hence the depth that the fertilizer and/or seed which exits through tube 18. It also sets the pressure on the packer/ depth control wheel by transferring weight from the machine to the wheel 38.

The operator may adjust tube 44 vertically where it is held by bracket 48, via the mounting sleeve 49, and from side to side horizontally by means of the adjustment provided by bolts 50 engaging aperture 46 and slotted aperture 47.

Advantages of this particular device may be summarized as follows:

(1) It may be adapted to an existing cultivator in a relatively short time.

(2) It may be easily adjusted to satisfy seed, fertilizer, soil, moisture and trash conditions.

(3) It is relatively simple to maintain as it has very few moving parts and has several forms of spring protections such as trip 13, springs 33 and springs 45.

(4) It is of a relatively low cost in design and therefore suitable for all types of farms who wish to use various seed and fertilizer supply systems.

(5) It may be used in conventional or zero tillage seeding operations.

(6) It relies on its design for penetration rather than heavy weight and therefore is moderate in the use of horse power and energy requirements.

(7) It permits accurate depth control and packing which is not possible with many conventional cultivator/seeding devices.

(8) There is independent adjustment for each unit of:
 (a) fertilizer depth;
 (b) seed position, both vertical and horizontal;
 (c) packer pressure.

(9) It is capable of working in a wide range of soil and moisture conditions.

(10) It moves trash to the side and leaves a narrow depression in the soil due to the packer wheel 38 thus allowing good seed and fertilizer contact with the soil and provides an excellent mini or micro-climate for plant development.

(11) The total system utilizes a two knife type openers in sequence to place fertilizer and/or seed with control of depth of operation by a directly attached packer/-depth control wheel.

(12) As well as being adaptable for connection to existing cultivators, it may be utilized as part of a specifically built seeding/fertilizer machine.

(13) The feed tube 44 provides a fully integrated spring protection system 45 forming part of the tube thus preventing any damage occurring during use and also will vibrate to clear trash.

(14) The knife opener system is adjustable to permit delivery of one product exactly relative to the other product or vertically above or below and/or horizontally to either side.

(15) It is provided with a mounted coulter which is entirely and completely attached yet can easily be removed together with the knife opener 15 which follows same.

(16) The feed tube 44 may enter the soil at an angle to forward travel so that less surface plugging from crop residue and less soil disturbance occurs.

(17) The adjustment rod 40 which controls the relationship of the packer/depth control wheel 38 to shank 11, creates a positive control of the wheel 38 to the shank 11. Also the forces exerted to force the wheel 38 vertically, are transferred forwardly to a forward portion of the shank 11 thereby reducing strain on the shank. These forces are transferred through bracket 25 secured to the front end of the shank. Also to be noted is that the individual unit on the seeder is independently adjusted.

(18) The second feed tube 44 is placed at a sufficient distance behind the knife 15 to allow soil to flow back into the slot formed by the knife, prior to tube 44 passing through same area. This allows the tube 44 to deposit seed and/or fertilizer at a set level relative to the seed and/or fertilizer placed at a lower level by means of tube 18.

(19) Tube 44 can be adjusted horizontally from side to side to place seed and/or fertilizer on previously undisturbed soil. At the same time it will force soil over the material (fertilizer or seed) placed by tube 18 immediately behind knife 15. This means that seed can emerge from the side wall of the slot and avoid coming through the base of the slot where fine soil may be washed in, hardened and thus seal the seed and prevent same from emerging.

(20) The close proximity of the tube 44 to the packer wheel permits the ultimate in depth control of the product delivered by this tube. The wheel 38 operates in the narrow slot created by the knife 15 and/or tube 44 and permits the placing of a certain amount of soil over the product delivered by this tube 44 by forcing the loose soil ahead and down as it rolls forwardly, it being understood that the wheel 38 is held in a rigid position by means of the adjustment rod 40.

(21) In conjunction with the previous statement, the wheel 38, by its action, operates as a seed/fertilizer covering and packing device. It should also be noted that the tube 44 mounted on the bell crank portion 35 which also carries the wheel 38 so that they both move together thereby preserving the relationship between them.

Turning now to FIGS. 5 through 9, there is shown a modified apparatus for placing seed and fertilizer. In this arrangement, the coulter 22 is omitted and the furrow is wholly formed by the knife 15.

The shape of the lever supporting the second tube 44 and the packer wheel 38 is modified as shown at 301 so that the link from the support 42 is communicated through a lever portion 361 connected to a center section of the lever portion 351. In addition, the coupling between the rod 401 and the bracket 42 incorporates a spring 431 between nuts 432 and 433 thus allowing the packer wheel and second tube 44 to lift should they encounter an obstruction relative to the knife 15 with the lifting movement being taken up by the spring 431. The spring 431 then acts to return the packer wheel to the required position and apply the necessary pressure as previously set by adjustment of the rod 401.

The shank of the knife indicated at 111 is modified in that it is formed of two portions comprising a spring section 112 and a vertical shank section 113. The latter is turned in a "edge-on" direction so that it is formed from a strip material having a thickness less than its width with a thickness arranged transverse to the direction of movement so as to reduce the possibility of trash collecting at the front edge of the shank portion 113.

In addition, to further act to deflect such trash, a roller 114 is mounted for rotation about an axis longitudinal of the shank portion 113 that is about a vertical axis on pins 115 mounted on a front surface of the shank portion 113.

A pair of deflector blades or plates 141 is mounted on the shank portion 113 at the coupling thereof with the knife 15 and each plate 141 extends therefrom rearwardly on a respective side of the tube 18, the tube 44 and terminates at a position just at the front of the packer wheel 38. The lower edge of the deflector plates 141 is arranged relative to the knife 15 to lie at the surface of the ground so as to run along the surface of the ground and to deflect trash away from the tubes and the packer wheel to prevent the trash collecting in that area.

Figure 8:
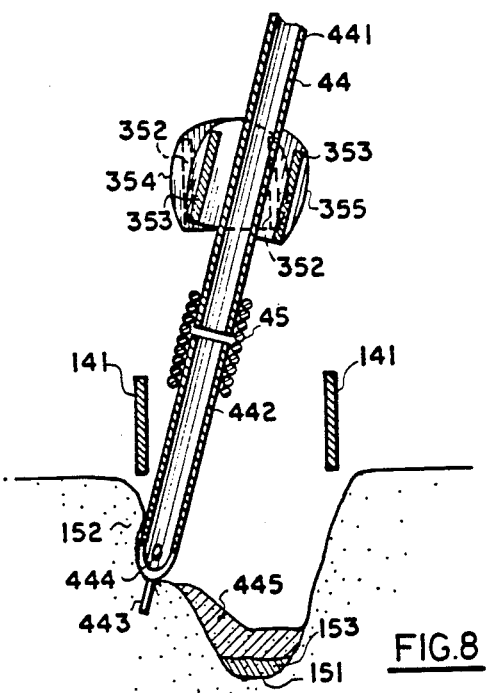

The construction of the tube 44 is shown in more detail in FIG. 8 and comprises two tube portions 441 and 442 which are connected together by the spring 45 so that the spring acts as a bridge between the portions but allows the lower portion 442 to flex away from the portion 441 on encountering an objection. A front edge of the portion 442 carries a tip or rod 443 which projects beyond the lowermost edge of the tube 44 and acts to scrape the surface of the ground. The rod 443 which can be circular in cross section acts to reduce wear on the front edge of the tube and also reduces the possibility of damp soil being forced backwards up the tube 44 thus preventing the seed from being properly deposited on the ground. In order to assist this effect, the tube end is chamfered so that the front edge engages the soil and allows the seed indicated at 444 to drop out of the tube onto the ground.

As shown in FIG. 8, the tube 44 is adjusted relative to the tube 18 so that it lies higher than the end of the tube 18 and such that it is twisted to one side. In this way the lowermost edge of the tube 44 scrapes the side of the furrow formed by the knife 15 pushing the soil forwardly so as to partially fill the furrow with soil as indicated at 445. Thus, as shown in FIGS. 5 and 8, the furrow as cut by the knife is indicated at 151 and a side wall of the furrow is indicated at 152 where the tube 442 scrapes the side to deposit the seed in unturned soil at the side away from the fertilizer escaping from the tube 18 and indicated at 153.

The spacing between the first and second tubes is such that soil can fall between the tubes as shown so that the seed is spaced away from the fertilizer by soil which is being filled in on top of the fertilizer. In practice the spacing can be of the order of eight inches and preferably in the range from six inches to twelve inches. An adjustment of the tube 44 relative to the lever portion 351 can be obtained similar to that shown in FIGS. 3 and 4 and this portion is omitted from FIGS. 5 and 8 for convenience of illustration.

Figure 9:
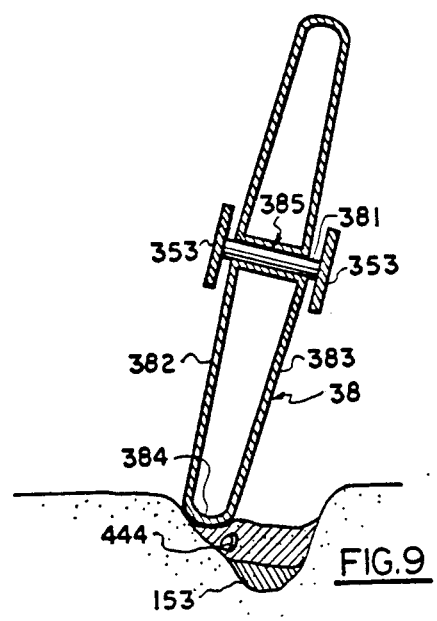

As shown in FIGS. 5, 8 and 9, the lever portion 351 is divided into two section 352 and 353 each having two portions on either side of the packer wheel and tube. The two sections are coupled by plates 354, 355 which are bolted together in a manner which allows then to be twisted about an axis longitudinal of the lever portion 351 so as to obtain the twisting as best shown in FIG. 8. This twisting acts to twist the tube 44 as shown in FIG. 8 and also to twist the axle 381 of the packer wheel 38 as shown in FIG. 9. In addition separate adjustment of the tube 44 relative to the section 353 of the lever can be provided as shown in FIGS. 3 and 4 to allow adjustment of the packer wheel separately from the adjustment of the tube.

As shown in FIG. 9 the twisted axle of the packer wheel adjusts the radial plane of the wheel out of the vertical so that the packer wheel can act for example more effectively on the side of the furrow adjacent the seed 444.

The packer wheel is formed by rotational molding from polyethylene to provide a packer wheel of a plastics material having end faces 382, 383 which taper slightly from the axle 381 to a peripheral wall 384. The walls 382, 383 are free from indentations or recesses which could in any way trap trash or other material. The rotational molding provides a hollow body which is able to flex.

The width of the packer wheel at the peripheral wall 384 is arranged to be such that it rolls within the furrow at a position beneath the surface of the ground but above the bottom of the furrow so that it pushes earth forwardly as indicated at 154 to cover the seed. In practice the width of the knife can be of the order of three-quarters inch and is preferably less than one and a half inches since a wider knife will cause too much soil disturbance, prevent proper placement of the seed, and will require a larger packer wheel. This forms a furrow which is effectively three-quarters inch at the bottom but widens out into a V-shape having a width greater than the width of the packer wheel at the top. In practice the packer wheel may be one and three-quarters inch in width at the peripheral wall 384 and is preferably less than four inches.

The hollow rotationally molded packer wheels can be mounted on an individual bearings 385 or alternatively can be mounted on a common shaft and run in gangs. In such a case the shaft may be square so that the shaft itself rotates in bearings at the ends.

The rotationally molded packer wheels have the advantage that they can flex through a certain degree to release any stones that may get caught between two wheels or between a wheel and a support member. They can also follow the furrow when the machine is slightly off a straight line of travel for example during cornering. In addition, the plastics material has a lighter weight than previous metal packer wheel thus reducing the strength and material necessary in structural members supporting the packer wheels. This is particularly significant in transport of large multi-section machines. The packer wheels also have a solid color molded throughout the plastics material and thus when abraided do not reveal different colors or bare material which can corrode. The smooth tapered sides of the packer wheels prevent the built up of soil and trash and a result in distortion of the width of the furrow. The wheels are also quiet in operation due to the sound deadening properties of the plastics material structure.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. Apparatus for planting two different materials in the ground comprising:

a frame including hitch means to connect said frame to a prime mover for transport across the ground;

first material delivery means comprising means for forming a furrow in the ground consisting solely of knife means, means mounting the knife means on the frame with said knife mounted to cut a furrow in the ground as the frame is moved forwardly over the ground, a first tube means, means for supplying a first material to the first tube means, and means mounting the first tube means on the knife means at a position immediately rearwardly thereof for depositing said first material into the furrow;

second material delivery means comprising soil engaging and opening means consisting solely of a second tube means formed by a single tube said single tube having an open mouth at the lower end, said lower end defining ground engaging means, means for supplying a second material to the second tube means, and means mounting the second tube means rearwardly of and separately from the knife means;

said second tube mounting means comprising a member positioned above the furrow from which the second tube extends downwardly into the furrow to engage soil therein;

said second tube mounting means mounting said second tube means spaced from the first tube means to leave a free space behind said first tube means and in front of said second tube means within which soil falls into the furrow as the first and second tube means are moved along the furrow behind the knife;

and a packer wheel assembly comprising a packer wheel and means mounting the packer wheel rearwardly of the second tube means for following in the furrow behind the second tube means;

said mounting means for said packer wheel and said mounting means for said second tube means comprising a single mounting member, means pivotally connecting said single mounting member rearwardly of said knife means, the second tube means being rigidly supported by said single mounting member between said knife means and the packer wheel and means for applying a bias to said single mounting member tending to hold said second tube means and said packer in contact with the ground;

said packer wheel and said knife means having cooperating respective widths, the packer wheel at its periphery being wider than the knife means and narrower than a widest part of the furrow formed by the knife to cause the packer wheel to run in the furrow at a position below ground level so as to act to positionally retain said second tube means in the furrow.

2. The invention according to claim 1 wherein the second tube means carries a vertical rod member on a front edge thereof for engaging the ground forwardly and downwardly of an open end of the second tube means.

3. The invention according to claim 1 further including means for positioning an open lowermost end of said second tube means to one side and above an open lowermost end of the first tube means so that the second tube means follows the first tube means so that the second tube means follows in the furrow but scrapes along a side wall of the furrow.

4. The invention according to claim 1 wherein said single mounting member comprises a pair of arms extending rearwardly from said knife means with said second tube means and said packer wheel mounted between said arms, said second tube means being mounted directly upon and supported solely by said member.

5. The invention according to claim 1 including means for adjusting the angle of a radial plane of the packer wheel relative to a vertical plane in the direction of motion of the frame.

6. The invention according to claim 1 including side deflector plates mounted on said knife means and extending rearwardly therefrom each on a respective side thereof at a level such that a lower edge of each plate lies approximately at ground level so as to deflect trash from said first and second tube means.

7. The invention according to claim 1 wherein the second tube means includes a flexible portion to allow a lowermost ground engaging portion of the tube means to resiliently flex and vibrate relative to an upper portion thereof.

8. The invention according to claim 7 wherein the flexible portion comprises a spring and the upper and lowermost portions of the tube are formed from two separate pieces united by said spring.

9. The invention according to claim 1 including a shank for supporting said knife means, said shank being formed from a strip material having a thickness less than a width thereof and wherein the thickness lies transverse to the direction of motion.

10. The invention according to claim 9 wherein the shank carries a roller rotatable about an axis longitudinal of the shank and including means rotatably mounting said roller forwardly of the shank for deflecting trash to either side of the shank.

* * * * *